(12) United States Patent
Mammou et al.

(10) Patent No.: US 10,097,835 B2
(45) Date of Patent: Oct. 9, 2018

(54) CONTENT-ADAPTIVE B-PICTURE PATTERN VIDEO ENCODING

(71) Applicants: Advanced Micro Devices, Inc., Sunnyvale, CA (US); ATI Technologies ULC, Markham (CA)

(72) Inventors: Khaled Mammou, Markham (CA); Ihab M. A. Amer, Markham (CA); Oleksandr O. Bobrovnik, Kyiv (UA); Vladyslav S. Zakharchenko, Kyiv (UA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 501 days.

(21) Appl. No.: 14/638,503

(22) Filed: Mar. 4, 2015

(65) Prior Publication Data

US 2016/0261869 A1 Sep. 8, 2016

(51) Int. Cl.
| | |
|---|---|
| H04N 19/136 | (2014.01) |
| H04N 19/177 | (2014.01) |
| H04N 19/50 | (2014.01) |
| H04N 19/147 | (2014.01) |
| H04N 19/114 | (2014.01) |
| H04N 19/19 | (2014.01) |

(52) U.S. Cl.
CPC ......... *H04N 19/136* (2014.11); *H04N 19/114* (2014.11); *H04N 19/147* (2014.11); *H04N 19/177* (2014.11); *H04N 19/19* (2014.11); *H04N 19/50* (2014.11)

(58) Field of Classification Search
CPC .. H04N 19/114; H04N 19/136; H04N 19/147; H04N 19/177; H04N 19/19; H04N 19/50
USPC .................................................... 375/240.02
See application file for complete search history.

(56) References Cited

U.S. PATENT DOCUMENTS

| | | | |
|---|---|---|---|
| 8,873,627 B2 | 10/2014 | Huang et al. | |
| 2004/0146108 A1* | 7/2004 | Hsia ..................... | H04N 19/139 375/240.16 |
| 2011/0069757 A1 | 3/2011 | Ammu et al. | |
| 2014/0153639 A1 | 6/2014 | Zhao et al. | |
| 2014/0254660 A1* | 9/2014 | La .................... | H04N 19/00163 375/240.02 |

OTHER PUBLICATIONS

Yi-Hau Chen et al, "Fast Prediction Algorithm of Adaptive GOP Structure for SVC", Proc. SPIE 6508, Visual Communications and Image Processing 2007, 6508U, Jan. 9, 2007, pp. 3, 5-6 and figures 3-4 and 6.
PCT International Search Report dated Jun. 8, 2016 for PCT Application No. PCT/US2016/019828.

* cited by examiner

*Primary Examiner* — William C Vaughn, Jr.
*Assistant Examiner* — Naod Belai
(74) *Attorney, Agent, or Firm* — Volpe and Koenig, P.C.

(57) ABSTRACT

A method of video encoding is disclosed which is content adaptive. The encoding method is automatically adjusted to optimize the encoding, the adjusting depending on the content of the pictures being encoded. A system for implementing the method and a non-transitory computer-readable storage medium for storing instructions of the method are also disclosed.

20 Claims, 5 Drawing Sheets

FIG. 4

CONTENT-ADAPTIVE B-PICTURE PATTERN VIDEO ENCODING

FIELD OF THE INVENTION

The present invention is generally directed to video, and in particular, to digital video processing.

BACKGROUND

Video encoders compress sequences of video pictures, or frames, by reducing spatial and temporal redundancies. This is done by performing prediction processes in the spatial and/or temporal domains. If the prediction process uses only information in a current picture, it is referred to as intra-prediction, and the picture being encoded is called an I-picture. By contrast, if the prediction process uses correlations between different pictures, it is referred to as inter-prediction. Most encoders support two types of inter-prediction, called P (predicted) prediction and B (bidirectional) prediction. The main difference is that P-prediction predicts the value of a current block based on only one prediction block, while B prediction allows interpolation-based prediction of a current block based on two previously encoded blocks.

A macroblock (MB) is a block of 16×16 pixels. All macroblocks in an I-picture are intra-predicted, while MBs in a P picture may be either P-inter or intra-predicted (whichever is more efficient). Finally, MBs in a B picture are allowed to be either B-inter, P-inter, or intra-predicted.

In video compression, a group of pictures (GOP) specifies the order in which intra- and inter-pictures are arranged. The GOP is a group of successive pictures within a coded video stream. Each coded video stream consists of successive GOPs.

Pictures are encoded based on prediction structures. A prediction structure describes which pictures in a GOP are used to encode a given picture in the GOP and the type of each prediction: I, P, or B. Existing encoding methods use a fixed prediction structure, without taking into account the nature of the picture content. This can result in encoding which is not optimal.

SUMMARY OF EMBODIMENTS

A method of video encoding is disclosed which is content adaptive—that is, the encoding method automatically adjusts one or more aspects of an encoding process in order to optimize the encoding. The adjustments depend on the content of the pictures being encoded. In an embodiment, the aspects adjusted may be a size of a group of pictures and a prediction structure. A system for implementing the method and a non-transitory computer-readable storage medium for storing instructions of the method are also disclosed.

BRIEF DESCRIPTION OF THE DRAWINGS

A more detailed understanding may be had from the following description, given by way of example in conjunction with the accompanying drawings wherein.

DETAILED DESCRIPTION

A method and system for content adaptive video encoding will now be described in detail. The method includes selecting a group of pictures (GOP) and a prediction structure to optimize the encoding of the pictures, or frames, that make up a moving video image. An optimization metric that may be used to optimize the encoding is rate-distortion (RD) cost. These terms are explained in what follows.

Rate-distortion cost refers to the combination of bitrate, or number of bits, needed to encode a picture or group of pictures, and image distortion introduced by the encoding. Generally, reducing the number of bits used to encode a picture will tend to result in more distortion—there is less information in the encoded picture. A combination of rate and distortion is therefore needed for a reasonable metric of encoding optimization. Methods of determining distortion are discussed later herein.

Figure 1:
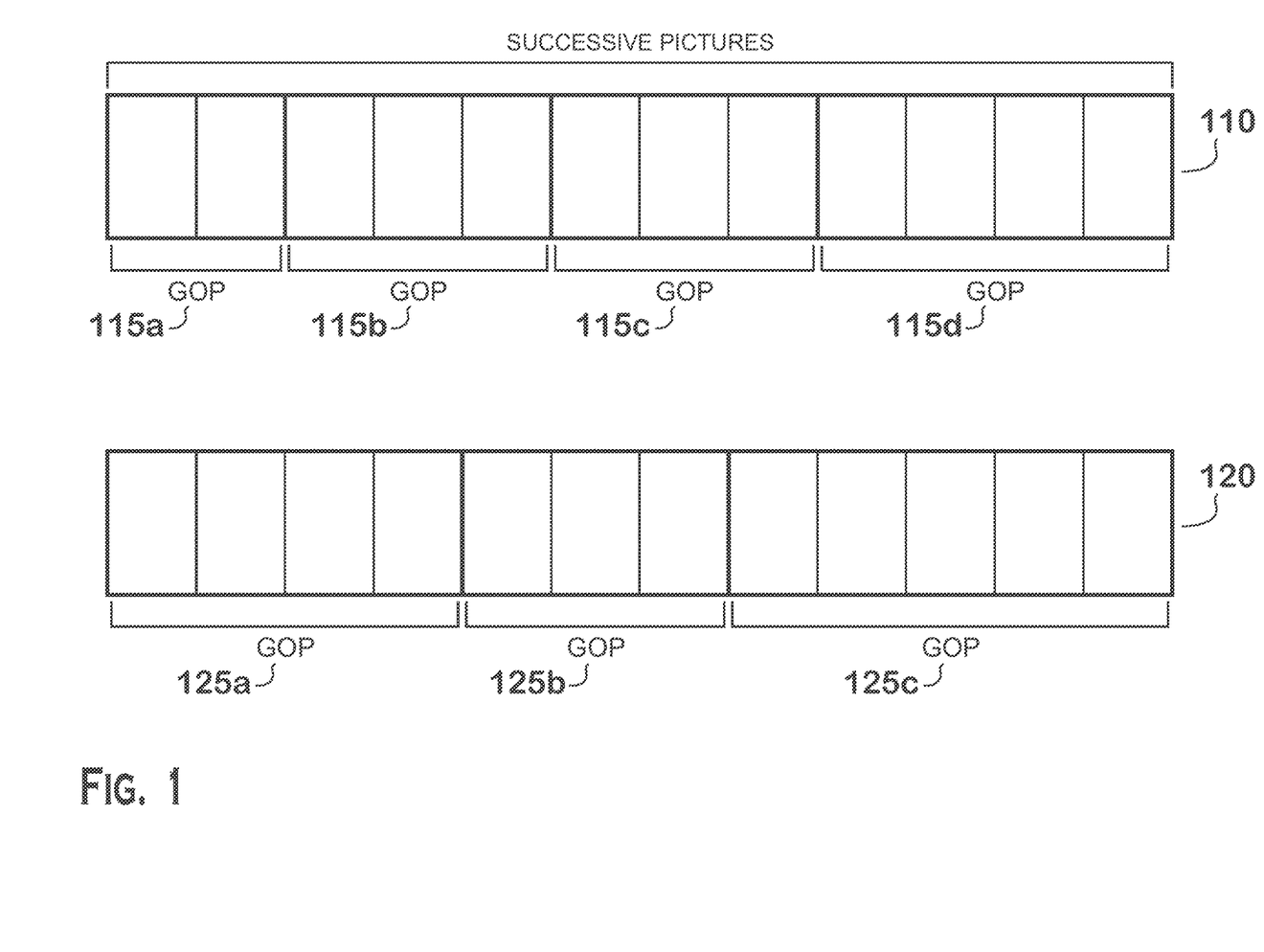
FIG. 1 shows examples of group of pictures decompositions.

FIG. 1, not to be considered limiting, shows examples of GOPs and GOP decompositions. Shown are 12 successive pictures in a video sequence. The 12 successive pictures are shown decomposed into two distinct GOP decompositions 110 and 120. In decomposition 110 the 12 pictures are shown decomposed into four GOPS, 115*a*-115*d* having respective sizes of two pictures, three pictures, three pictures, and four pictures. In decomposition 120 the same 12 pictures are decomposed into three GOPS, 125*a*-125*c* having respective sizes of four pictures, three pictures, and five pictures. The number of GOPs and the number of pictures in each GOP is not fixed.

Figure 2:
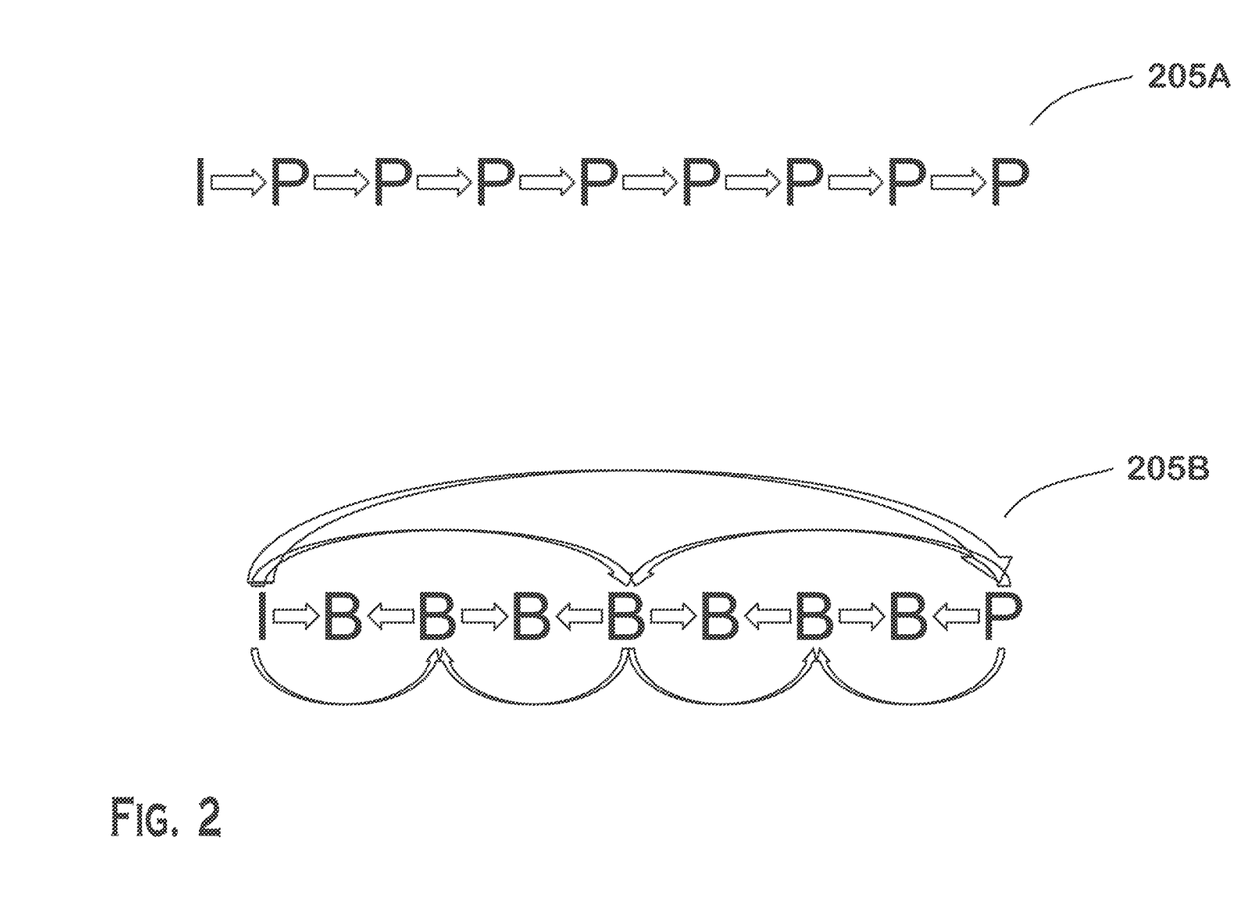
FIG. 2 shows two examples of a prediction structure.

FIG. 2, not to be considered limiting, shows examples of two different prediction structures, 205A and 205B, being applied to an example GOP containing nine pictures. In 205A, only the first picture is encoded as an I picture, while all other pictures are encoded a P pictures, each picture referring to the previous one. The prediction structure 205A may provide near-optimal encoding when, for example, the pictures being encoded include a rapidly moving object, but may provide suboptimal encoding when the pictures include a slowly moving object.

By contrast, if the pictures include, for example, a slowly moving object, and therefore exhibit high temporal correlations, the prediction structure 205B may provide closer to optimal encoding than 205A. Prediction structure 205B uses B frames and is referred to as a hierarchical B-structure (HBS). Thus, the prediction structure that results in optimal encoding, as measured by RD cost, depends on the content of the pictures being encoded.

Therefore, an encoding method that adapts its prediction structures to picture content may provide encoding optimization that is superior to an encoding method with a fixed prediction structure. Furthermore, a content adaptive video encoding method using HBS's may provide even better encoding.

Figure 3A:
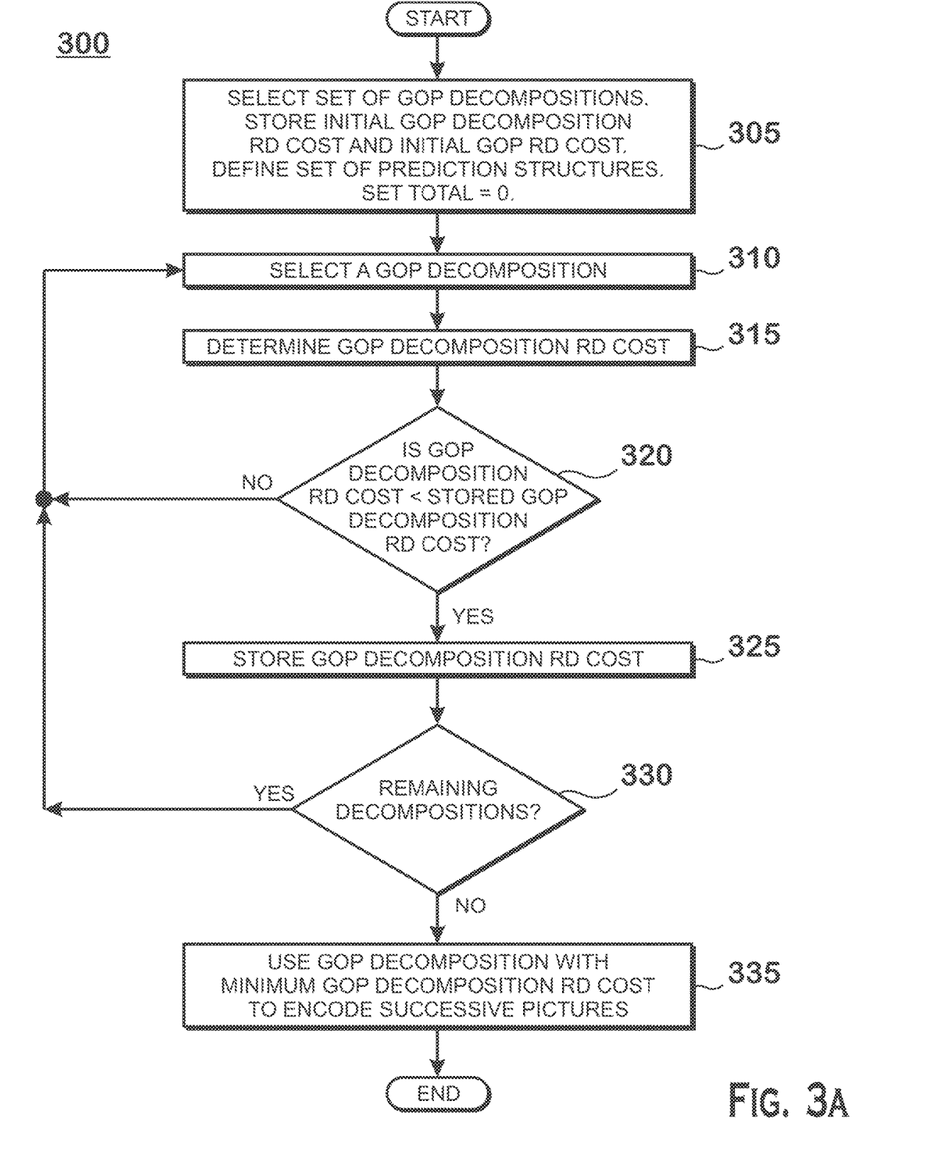
FIGS. 3A and 3B show an example of a method of video encoding.
Figure 3B:
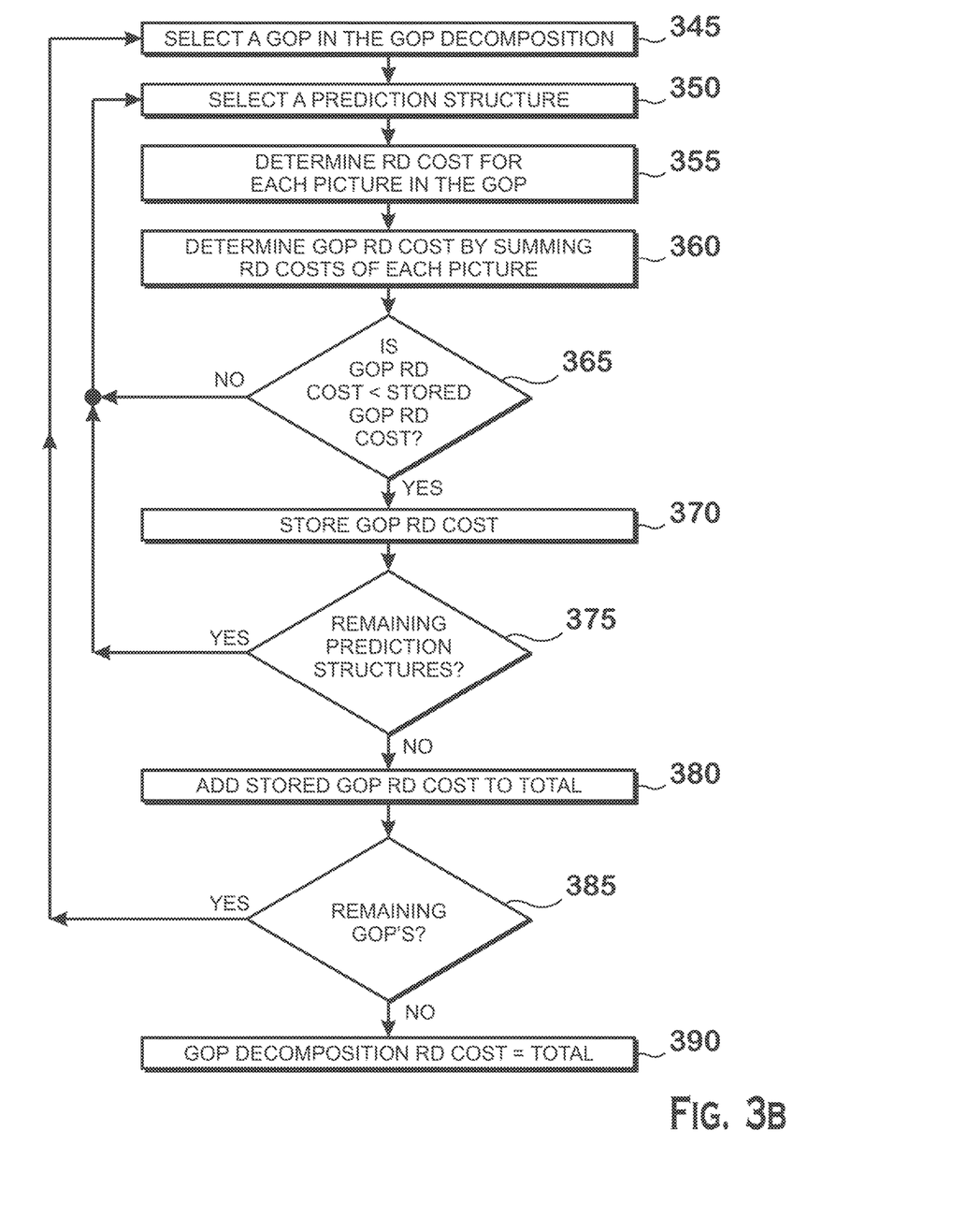

FIGS. 3A and 3B show an embodiment of a method 300 for content adaptive video encoding. FIG. 3A conveys an overview of method 300 and FIG. 3B shows details of an embodiment of a method of determining an RD cost for a GOP decomposition at 315. Overall the method may be described as follows. A set of GOP decompositions of a predetermined number of successive pictures is selected. For each GOP decomposition in the set, a GOP decomposition RD cost is determined by determining a GOP RD cost for each GOP in that GOP decomposition. A GOP decomposition from the set having a minimum GOP decomposition RD cost is selected for use in encoding the successive pictures.

Referring to FIG. 3A, method 300 is initialized by selecting a set of GOP decompositions from all the possible GOP compositions of a predetermined number of successive pictures 305. The set may be selected by, for example, selecting a small number of GOP decompositions already known to work well. Alternatively, only GOP decompositions within a defined range of sizes may be selected. In another alternative, known scene change algorithms may be used to guide the selection of GOP sizes.

Method 300 is further initialized by storing an initial value of a stored GOP decomposition RD cost and an initial value of a stored GOP RD cost 305. Method 300 is further initialized by setting a quantity TOTAL equal to zero 305. The quantity TOTAL will be used to sum GOP RD costs to obtain a GOP decomposition RD cost.

Method 300 is further initialized by defining a set of prediction structures from possible prediction structures for a GOP 305. The set of prediction structures may include at least one hierarchical B structure. Defining a set of prediction structures may include selecting prediction structures that meet constraints of a decoded picture buffer (DFB) used to store previously decoded pictures. Since decoders may be constrained in terms of memory and processing capabilities, there may be a limit on the size of the DFB. Alternatively, known scene change algorithms may be used to guide the selections of prediction structures for the set of prediction structures.

Following initialization, a GOP decomposition is selected from the set of GOP decompositions 310. A GOP decomposition RD cost for the selected GOP decomposition is determined 315. This GOP decomposition RD cost is compared with the stored GOP decomposition RD cost 320. If the GOP decomposition RD cost is not less than the stored value the method returns to 310 and a new GOP decomposition is selected. If, on the other hand, the GOP decomposition RD cost is less than the stored value, this new GOP decomposition RD cost is stored 325, replacing the current stored value.

The method then checks if there are any remaining GOP decompositions in the set 330. If there are, the method returns to 310 to select a new GOP decomposition from the set. If there are not, then the stored GOP decomposition RD cost is a minimum, and the GOP decomposition having that minimum is used to encode the successive pictures 335.

FIG. 3B shows details of determining GOP decomposition RD cost at 315 in FIG. 3A. Overall, determining GOP decomposition RD cost in this method embodiment may be summarized as follows. As described above, a set of prediction structures is defined in initialization 305. For each GOP in a GOP decomposition, a prediction structure RD cost is determined for each prediction structure in the set. A minimum prediction structure RD cost among all of these determined prediction structure RD costs is chosen as the GOP RD cost for the GOP. A GOP decomposition RD cost is determined by summing GOP RD costs for all GOPs in the GOP decomposition.

Referring to FIG. 3B, details of determining GOP decomposition RD cost are as follows. A GOP in a current GOP decomposition is selected 345. (A current GOP decomposition has been selected at 310 in FIG. 3A.) A prediction structure is selected from the previously initialized set of prediction structures 350. An RD cost is determined for each picture in the GOP for the selected prediction structure 355.

In an embodiment an RD cost for each picture may be determined by determining a distortion and a bitrate and using the formula:

$$\text{RD cost} = \text{distortion} + L*\text{bitrate} \quad \text{Equation (1)}$$

where L is a parameter that depends on the picture type and encode parameters such as a quantization parameter. Distortion may be determined by applying a motion estimation process for a current GOP and a current prediction structure. The applied motion estimation process makes it possible to predict the content of every picture in the GOP, by using a set of previously encoded pictures, referred to as reference pictures. This prediction process usually produces predicted pictures close but different from the original picture. The difference between the predicted picture and the original one is called prediction error or prediction distortion. Usually, the higher the prediction distortion, the higher the amount of information that needs to be encoded to represent the original picture. Distortion may be measured by using a metric known in the art, such as sum of absolute differences (SAD), sum of absolute transformed differences, (SATD) or mean absolute difference (MAD). Bitrate may also be determined using known methods. Determination of RD cost for each picture in a GOP may include estimating a bitrate from a distortion using a rate-distortion model, such as a quadratic rate-distortion model. Determining RD cost may be applied to original input pictures rather than reconstructed ones, or to down-sampled versions of a video.

Returning to FIG. 3B, the RD costs of all pictures in the GOP are summed to determine a GOP RD cost 360. This GOP RD cost is compared to a stored GOP RD cost 365. (The stored GOP RD cost is initialized at 305 in FIG. 3A.) If the GOP RD cost is not less than the stored GOP RD cost the method returns to 350, where a new prediction structure is selected. If, on the other hand, the GOP RD cost is less than the stored GOP RD cost, this new GOP RD cost is stored 370, replacing the current stored value.

The method then checks if there are any remaining prediction structures 375. If there are, the method returns to 350 to select a new prediction structure. If there are not, then the stored GOP RD cost contains a minimum RD cost over the prediction structures. The stored GOP RD cost is then added to the amount TOTAL 380.

The method then determines whether there are remaining GOPS in the current GOP decomposition 385. If there are, then the method returns to 345, and a new GOP is selected. If there are no remaining GOPS, then the sum in TOTAL is GOP decomposition RD cost. This GOP decomposition RD cost is passed to 320 in FIG. 3A and the overall method shown in FIG. 3A continues.

To reduce computational complexity, an early termination strategy based on per-picture or per GOP maximum RD costs could be implemented in an embodiment of the method.

A method as just described may also be described by the following pseudocode:

```
GOP decomposition and initialize its RD cost to a big value
RD_Optimal_Decomposition = MAX_RD_COST (for initialization)
Optimal_Decomposition = one GOP IPPPPP (for initialization)
```

```
        // Find the decomposition into a set of GOPs, which leads to the
        minimal RD cost
For any possible decomposition D of the next
MAX_NUM_LOOKAHEAD_PICTURES pictures into a set of GOPs (i.e., (GOP_i))
        // Compute the RD cost of decomposition D by accumulating the RD
        cost of its GOPs
        RD_D = 0
        For every GOP_i
                // Find the prediction structure for GOP_i, which leads to the
                minimal RD cost
                Optimal_Prediction_Strcture = IPPPPP GOP structure (for
                initialization)
                    RD_ Optimal_Prediction_Structure = MAX_RD_COST
                For every prediction structure PS of GOP_i meeting the DBP
                constraints
                    RD_PS = RD cost of PS
                    If (RD_PS < RD_Optimal_Prediction_Structure)
                            Optimal_Prediction_Structure = PS
                            RD_Optimal_Prediction_Structure = RD_PS
                    End
                End
                RD_D = RD_D + RD_Optimal_Prediction_Structure
        End
        // Select D as optimal decomposition if its RD cost is lower than the
    best RD cost so far
                If (RD_D < RD_Optimal_Deptimal_Decomposition = D
        End
End
```

Figure 4:
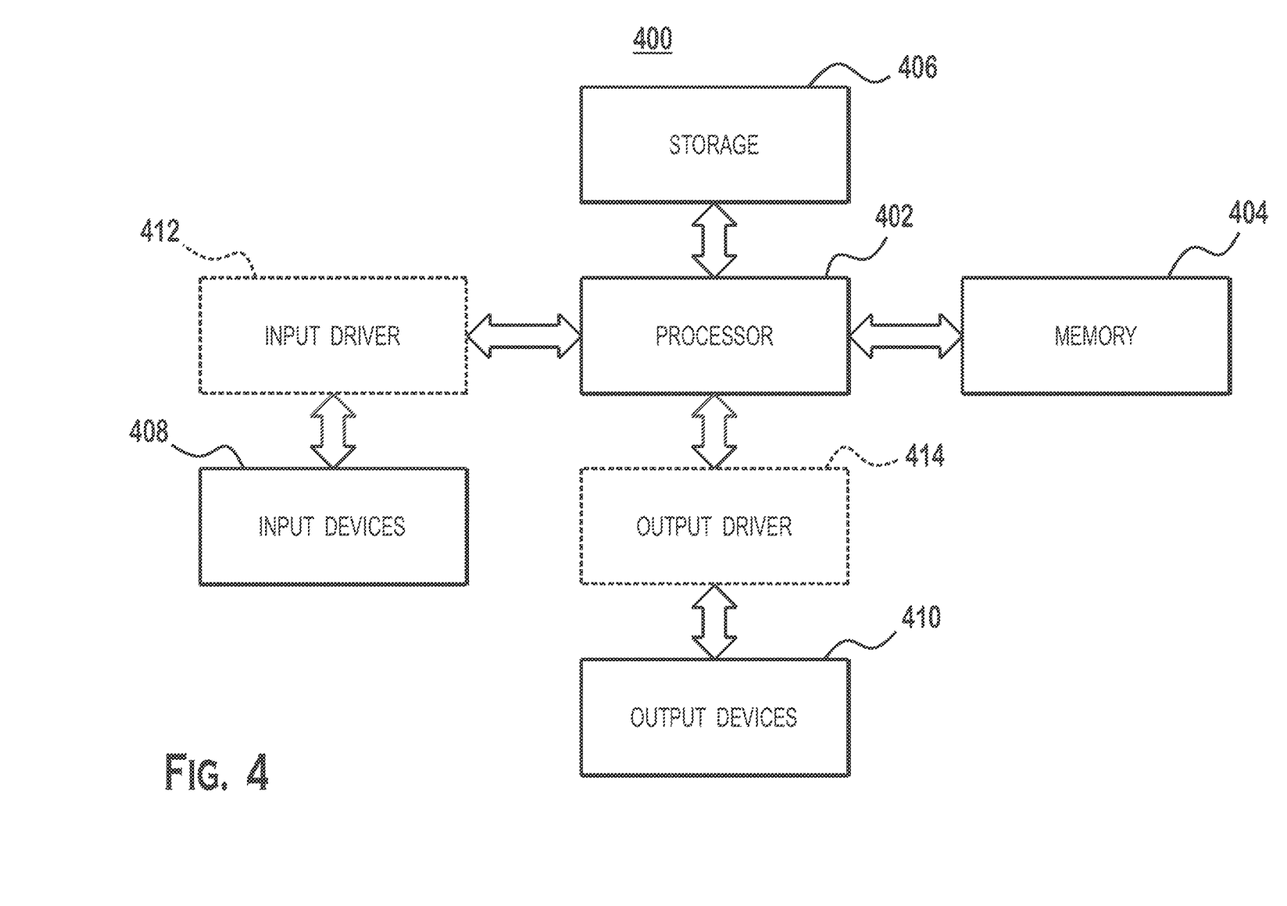
FIG. 4 is a block diagram of an example device or system in which one or more disclosed embodiments may be implemented.

FIG. 4 is a block diagram of an example device or system 400 in which one or more disclosed embodiments may be implemented. The system 400 may include, for example, a computer, a gaming device, a handheld device, a set-top box, a television, a mobile phone, or a tablet computer. The system 400 includes a processor 402, a memory 404, a storage 406, one or more input devices 408, and one or more output devices 410. The system 400 may also optionally include an input driver 412 and an output driver 414. It is understood that the system 400 may include additional components not shown in FIG. 4.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache. Memory 404 may include a decoded picture buffer (DFB) configured to store previously decoded pictures. These stored pictures may be used by processor 402 for encoding to form predictors for subsequent pictures.

The storage 406 may include a fixed or removable storage, for example, a hard disk drive, a solid state drive, an optical disk, or a flash drive. The input devices 408 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The input device may also include a source of video information, such as, but not limited to, a video camera, or a video playback device such as, but not limited to, a Blu-Ray player. The output devices 410 may include a display, a speaker, a printer, a haptic feedback device, one or more lights, an antenna, or a network connection (e.g., a wireless local area network card for transmission and/or reception of wireless IEEE 802 signals), or a video display.

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the system 400 will operate in the same manner if the input driver 412 and the output driver 414 are not present.

System 400 may be configured to implement a method of content adaptive video encoding, such as that described above, as follows. Processor 402 may be configured to perform the method. An input device 408 may be configured to supply video information, such as successive pictures, to processor 402. Memory device 404 may be configured to exchange video information with processor 402 and store video information.

Processor 402 may obtain a predetermined number of successive pictures supplied by input device 408. Processor 402 may retrieve a set of GOP decompositions of the successive pictures from memory device 404. Processor 402 may then proceed to determine, for each GOP decomposition in the set, an RD cost by determining an RD cost for each GOP in that GOP decomposition. Processor 402 may select a GOP decomposition from the set having a minimum RD cost for use in encoding the successive pictures. Processor 402 may be configured to perform all steps of each of the embodiments of a method for content adaptive video encoding as described herein.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for content adaptive video encoding, the method comprising:
   selecting a set of successive pictures;
   forming a plurality of distinct group of pictures (GOP) decompositions of the set of successive pictures, at least one of the GOP decompositions including a plurality of GOPs;
   determining, for each GOP decomposition in the plurality of distinct GOP decompositions, a GOP decomposition rate-distortion (RD) cost by determining a GOP RD cost for each GOP in that GOP decomposition, the RD cost for each GOP being based on a bit rate at which the GOP is encoded, and a measure of distortion associated with the GOP, the measure of distortion being based on a difference between an original version of at least one picture in the GOP and an encoded version of the picture; and
   selecting a GOP decomposition from the plurality of distinct GOP decompositions for use in encoding the successive pictures, wherein the GOP decomposition is selected based on having a lowest GOP decomposition cost in the plurality of distinct GOP decompositions.

2. The method of claim 1, wherein determining the GOP decomposition RD cost for each GOP decomposition comprises summing GOP RD costs for all GOPs in each GOP decomposition.

3. The method of claim 1, wherein the determining of a GOP RD cost comprises, for each GOP in each GOP decomposition:
   defining a set of prediction structures;
   determining a prediction structure RD cost for each prediction structure in the set; and
   choosing a minimum among the prediction structure RD costs as the RD cost for the GOP.

4. The method of claim 3, wherein the set of prediction structures includes at least one hierarchical B structure.

5. The method of claim 3, wherein defining a set of prediction structures comprises selecting prediction structures that meet constraints of a decoded picture buffer.

6. The method of claim 3, wherein determining the RD cost of each GOP comprises summing RD costs of each picture in each GOP for each prediction structure.

7. The method of claim 6, wherein the RD cost of each picture is determined from the formula RD cost=distortion+L*bitrate, where L is a parameter that depends on picture type and encode parameters.

8. The method of claim 3, wherein distortion is determined by applying a motion estimation process for a current GOP and a current prediction structure.

9. The method of claim 8, wherein distortion is determined using at least one of: sum of absolute differences (SAD), sum of absolute transformed differences (SATD) or mean absolute difference (MAD).

10. The method of claim 1, wherein determining an RD cost comprises estimating a bitrate from a distortion using a rate-distortion model.

11. The method of claim 1 applied to original input pictures or to down-sampled versions of a video.

12. A system for content adaptive video encoding, comprising:
    a processor;
    an input device configured to supply video information to the processor; and
    a memory device configured to exchange video information with the processor;
    wherein the processor is configured to perform a method for content adaptive video encoding, the method comprising:
    selecting a set of successive pictures supplied by the input device;
    forming a plurality of distinct groups of pictures (GOP) decompositions of the set of successive pictures, at least one of the GOP decompositions including a plurality of GOPs, wherein instructions for each GOP decomposition in the plurality are retrieved from the memory device;
    determining, for each GOP decomposition in the plurality, a rate-distortion (RD) cost by determining an RD cost for each GOP in that GOP decomposition, the RD cost for each GOP being based on a bit rate at which the GOP is encoded, and a measure of distortion associated with the GOP, the measure of distortion being based on a difference between an original version of at least one picture in the GOP and an encoded version of the picture; and
    selecting a GOP decomposition from the plurality for use in encoding the successive pictures, wherein the GOP decomposition is selected based on having a lowest GOP decomposition cost in the plurality of distinct GOP decompositions.

13. The system of claim 12, wherein the processor is further configured to determine an RD cost for each GOP in each GOP decomposition by the method further comprising:
    retrieving a set of prediction structures from the memory device;
    determining a prediction structure RD cost for each prediction structure in the set; and
    choosing a minimum among the prediction structure RD costs as the RD cost for the GOP.

14. The system of claim 13, wherein the processor is further configured to determine the RD cost of each GOP by the method further comprising summing RD costs of each picture in each GOP for each prediction structure.

15. The system of claim 14, wherein the processor is further configured to determine the RD cost of each picture by the method further comprising using the formula: RD cost=distortion+L*bitrate, where L is a parameter that depends on picture type and encode parameters.

16. The system of claim 13, wherein the processor is further configured to determine distortion by the method further comprising applying a motion estimation process for a current GOP and a current prediction structure.

17. The system of claim 16, wherein the processor is further configured to determine distortion using at least one of: sum of absolute differences (SAD), sum of absolute transformed differences (SATD) or mean absolute difference (MAD).

18. The system of claim 12, wherein the processor is further configured to determine the RD cost by the method further comprising estimating a bitrate from a distortion using a rate-distortion model.

19. The system of claim 12, wherein the processor is configured to apply the method to original input pictures or to down-sampled versions of a video.

20. A non-transitory computer-readable storage medium including instructions which, when executed in a processing system, cause the system to execute a method for content adaptive video encoding, the method comprising:

selecting a set of successive pictures;

forming a plurality of distinct groups of pictures (GOP) decompositions of the set of successive pictures, at least one of the GOP decompositions including a plurality of GOPs;

determining, for each GOP decomposition in the plurality of distinct GOP decompositions, a GOP decomposition rate-distortion (RD) cost by determining a GOP RD cost for each GOP in that GOP decomposition, the RD cost for each GOP being based on a bit rate at which the GOP is encoded, and a measure of distortion associated with the GOP, the measure of distortion being based on a difference between an original version of at least one picture in the GOP and an encoded version of the picture; and selecting a GOP decomposition from the plurality of distinct GOP decompositions for use in encoding the successive pictures in the set of successive pictures, wherein the GOP decomposition is selected based on having a lowest GOP decomposition cost in the plurality of distinct GOP decompositions.

* * * * *